United States Patent [19]

D'Silva

[11] 4,252,562

[45] Feb. 24, 1981

[54] ALLOY FOR BRAZING TITANIUM

[75] Inventor: Thomas L. D'Silva, Beaverton, Oreg.

[73] Assignee: GTE Products Corporation, Stamford, Conn.

[21] Appl. No.: 52,057

[22] Filed: Jun. 25, 1979

[51] Int. Cl.³ ............................................. C22C 21/12
[52] U.S. Cl. ...................................................... 75/140
[58] Field of Search ..................... 75/140, 143; 148/32

[56] References Cited

U.S. PATENT DOCUMENTS 2,473,060  6/1949  Hunsicker et al. ................... 75/140

*Primary Examiner*—R. Dean
*Attorney, Agent, or Firm*—John F. Lawler

[57] ABSTRACT

The invention is an aluminum base brazing alloy for brazing assemblies of titanium and titanium alloys with excellent wetting capability characteristics and the capability of forming large fillets at a relatively low temperature of 1470° F., consisting essentially by weight of about 2.0% to 6.0% silicon, 2.5% to 6.0% tin, 13.0% to 28.0% copper and the balance aluminum.

5 Claims, No Drawings

ALLOY FOR BRAZING TITANIUM

BACKGROUND OF THE INVENTION

The brazing of titanium and titanium alloys used in the construction of high speed aircraft may be accomplished with a brazing alloy consisting principally of aluminum. Such an alloy is described in U.S. Pat. No. 3,660,891 and comprises aluminum, copper and silicon. The copper serves to depress the alloy melting temperature but also decreases its fluidity. On the other hand, the silicon is believed to reduce the solvent action and to increase fluidity. The copper content is kept at a low level to minimize the formation of the brittle intermetallic phase of copper aluminide ($CuAl_2$). The disadvantage of high levels of silicon in the alloy as proposed in the above patent is the tendency of this component to precipitate into crystals during the brazing process thereby impairing the strength of the resulting joint.

The alloy of this invention utilizes tin in addition to aluminum, copper and silicon to substantially improve the wetting capability. This increased wetting capability permits reduction in the silicon content which in turn reduces the metalloid content in the brazed joint and correspondingly improves its mechanical properties.

A preferred embodiment of the invention comprises, expressed in percentages by weight, 3.0 silicon, 4.0 tin, 16.5 copper and 76.5 aluminum. An acceptable composition range in percentage by weight is 2.0 to 6.0 silicon, 2.5 to 6.0 tin, 13.0 to 28.0 copper and the balance aluminum.

EXAMPLE 1

An alloy of composition 3.5 Si, 5.0 Sn, 25.0 Cu, 66.5 Al was prepared by melting and casting in vacuum. Powder was prepared by filling the casting and this powder was used for brazing a T-joint of the well-known titanium-aluminum-vanadium alloy Ti-6 Al-4 V. The flow point of the alloy was 1425° F. The molten brazing alloy flowed through the complete joint and formed a heavy fillet. Upon cooling the joint was folded into a 90° bend and exhibited continuity without cracking. Knoop hardness (100 g load) of the joint was 154.

EXAMPLE 2

An alloy of composition 3.5 Si, 4.0 Sn, 67.2 Al, 25.3 Cu was prepared by vacuum melting and converted to powder by filing. The powder was used to braze a Ti-6 Al-4 V T-joint. The alloy flowed at 1500° F. through the joint and formed a heavy fillet, and passed the bend test described above. The joint had a Knoop hardness (100 g load) of 33).

EXAMPLE 3

An alloy of composition 3.5 Si, 5.0 Sn, 16.5 Cu, 75.0 Al was prepared by vacuum melting. This alloy was workable. A sample of the alloy was used to braze a Ti-6 Al-4 V T-joint. Complete flow of the molten alloy was achieved at 1470° F. The joint had a heavy fillet and did not crack when subjected to the 90° bend test. Knoop hardness (100 g load) was 124.

The alloy can be prepared in the form of powder by atomisation with an inert gas. The compositions which have a higher Al to Cu ratio are workable and could be formed into foil or wire.

What is claimed is:

1. A brazing alloy for use in joining titanium and titanium alloy members consisting essentially of in percent by weight 2.0 to 6.0 Si, 2.5 to 6.0 Sn, 13.0 to 28.0 Cu and the balance Al.

2. A brazing alloy consisting essentially of in percent by weight 2.5 to 5.0 Si, 3.0 to 5.0 Sn, 15.0 to 26.0 Cu and the balance Al.

3. A brazing alloy consisting essentially of in percent by weight 3.5 Si, 5.0 Sn, 25.0 Cu and 66.5 Al.

4. A brazing alloy consisting essentially of in percent by weight 3.5 Si, 4.0 Sn, 25.3 Cu and 67.2 Al.

5. A brazing alloy consisting essentially of in percent by weight 3.5 Si, 5.0 Sn, 16.5 Cu and 75.0 Al.

* * * * *